(12) United States Patent
Zelman

(10) Patent No.: US 7,028,576 B2
(45) Date of Patent: Apr. 18, 2006

(54) SHIFT LEVER ASSEMBLY

(75) Inventor: Witold Zelman, Redwood Park (AU)

(73) Assignee: M.T.M. PTY LTD, (AU)

( * ) Notice: Subject to any disclaimer, the term of this patent is extended or adjusted under 35 U.S.C. 154(b) by 0 days.

(21) Appl. No.: 11/086,675

(22) Filed: Mar. 23, 2005

(65) Prior Publication Data

US 2005/0193853 A1  Sep. 8, 2005

Related U.S. Application Data

(63) Continuation of application No. PCT/AU03/001255, filed on Sep. 23, 2003.

(30) Foreign Application Priority Data

Sep. 24, 2002 (AU) .............................. 2002951613

(51) Int. Cl.
*B60K 20/00* (2006.01)

(52) U.S. Cl. .................. 74/473.18; 74/473.12
(58) Field of Classification Search ............ 74/473.18, 74/473.1, 473.12, 335; 200/61.88
See application file for complete search history.

(56) References Cited

U.S. PATENT DOCUMENTS

| | | | |
|---|---|---|---|
| 4,987,792 A | 1/1991 | Mueller et al. | |
| 5,622,079 A | 4/1997 | Woeste et al. | |
| 5,799,539 A | 9/1998 | Haase | |
| 5,819,591 A | 10/1998 | Meyer | |
| 6,386,061 B1 | 5/2002 | Giefer | |
| 6,536,299 B1* | 3/2003 | Kim | 74/473.18 |
| 6,895,833 B1* | 5/2005 | Cho | 74/473.18 |
| 2001/0004850 A1* | 6/2001 | Kim | 74/473.12 |
| 2002/0029951 A1* | 3/2002 | Beattie et al. | 192/220.4 |

FOREIGN PATENT DOCUMENTS

| | | |
|---|---|---|
| EP | 0 279 087 B1 | 8/1988 |
| EP | 0 784 169 A2 | 7/1997 |
| EP | 0 859 170 | 8/1998 |
| WO | WO 01/08919 A1 | 2/2001 |
| WO | WO 01/73320 A1 | 10/2001 |

* cited by examiner

*Primary Examiner*—David Fenstermacher
(74) *Attorney, Agent, or Firm*—Stites & Harbison PLLC; Marvin Petry

(57) ABSTRACT

A shift lever assembly (10) including a base member (14) and a shift lever (12); the shift lever (12) being pivotally mounted to the base member (14). The shift lever (12) is pivotally adjustable by an operator, relative to the base member (14), along a shift lever path from an initial position to at least one further position. The pivotal mounting of the shift lever (12) to the base member (14) is configured to enable the shift lever (12) to be mounted in a plurality of pivotal mounting configurations relative to the base member (14). Each pivotal mounting configuration defines a unique shift lever path relative to the base member (14).

17 Claims, 10 Drawing Sheets

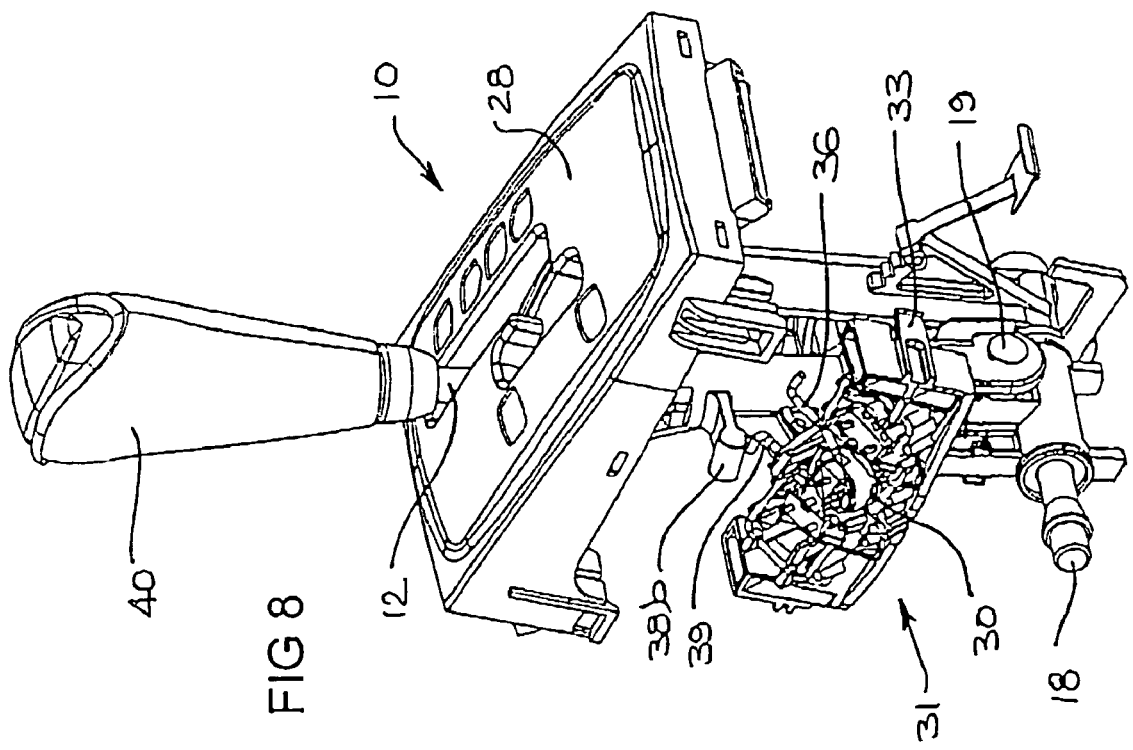
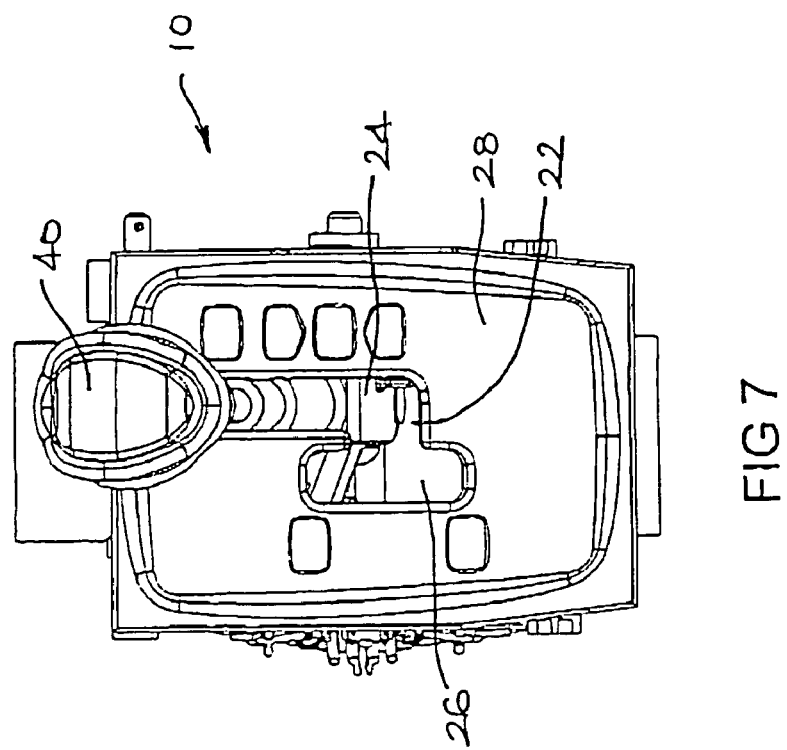

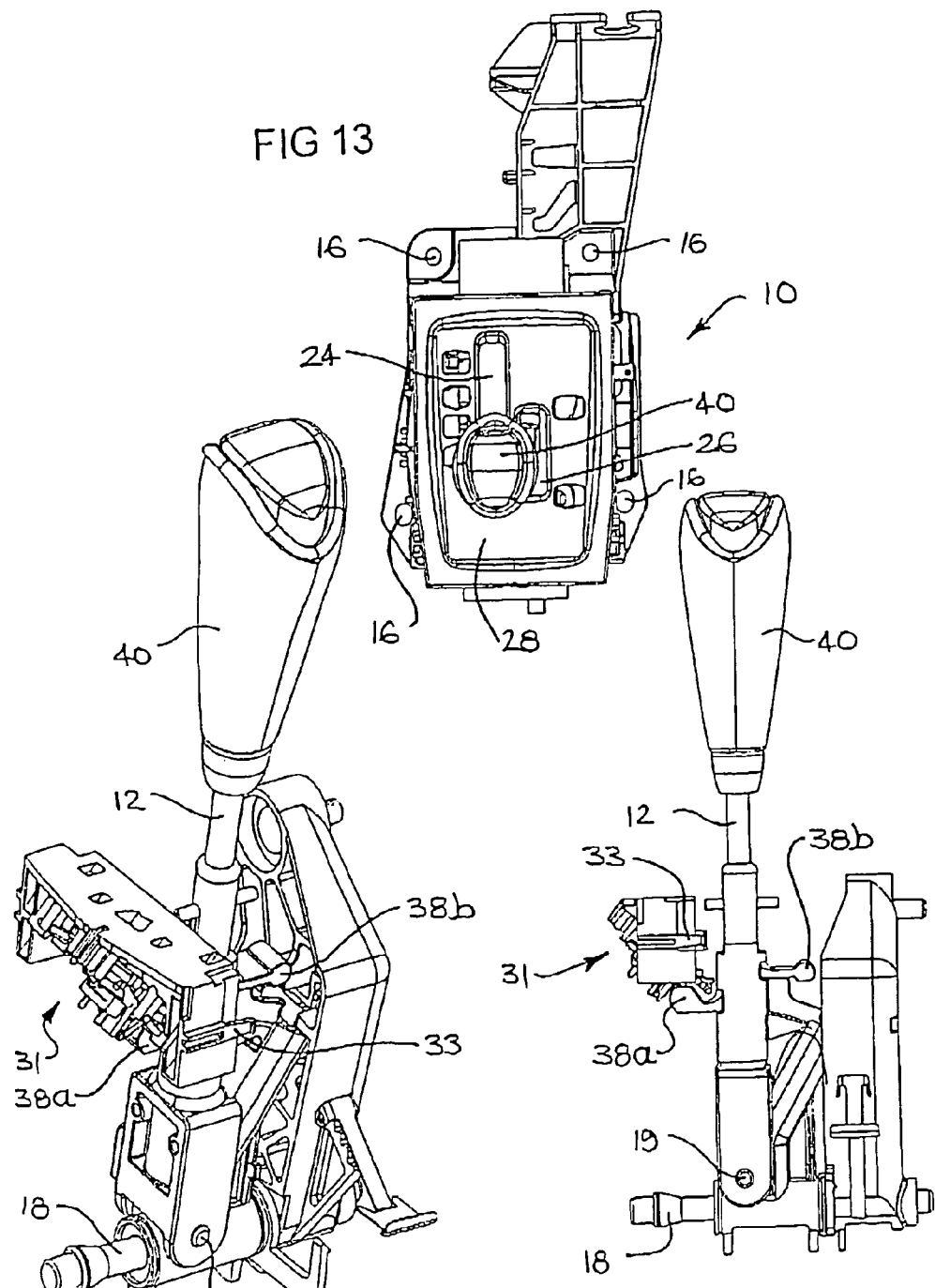

SHIFT LEVER ASSEMBLY

RELATED APPLICATION

This application is a continuation of International Application No. PCT/AU03/001255, filed Sep. 23, 2003.

The present invention relates broadly to a shift lever assembly for a vehicle transmission. The present invention particularly relates to a shift lever assembly for enabling a driver to select either an automatic shift mode or a manual shift mode, and is herein generally described in that context. However, it will be appreciated that the invention has broader application and is not limited to that particular use.

Shift lever assemblies of the type mentioned in the previous paragraph generally include two shift lever shifting paths. The first shifting path is provided for the automatic shift mode, allowing for the pre-selection of any one of, for example. a park (P) position, a reverse (R) position, a neutral (N) position, and at least one drive range (D) position.

The second shifting path is provided for the manual shift mode, and includes three positions in which the shift lever can adopt a neutral (or centre) position, an up-shift position and a down-shift position. In the second shifting path, the shift lever is shifted to the up-shift position from the neutral position to shift one gear up in the vehicle automatic transmission. Similarly, the shift lever is shifted from the neutral position to the down-shift position to shift one gear down.

The first and second shifting paths are generally arranged adjacent and parallel to one another. A changeover path is generally provided and connects the first and second shifting paths to one another, allowing for the shift lever to be moved between the first and second shifting paths.

Existing shift lever assemblies are configured for use in either left or right-hand drive vehicles. The arrangement of the automatic and manual shifting paths relative to the vehicle are reversed in a right-hand drive vehicle as compared to a left-hand drive vehicle. This is because it is desirable to arrange the paths, such that the automatic shifting path is located on the driver's side of the shift lever assembly. Thus, separate left and right-hand drive shift lever assembly versions are currently required for installation in left and right-hand drive vehicles.

Existing shift lever assemblies generally function satisfactorily. However, they are complex in design, with a large number of components. Consequently, current set-up and manufacturing costs are undesirably high.

It would therefore be desirable to provide a shift lever assembly of simplified construction when compared to existing shift lever assemblies.

According to one aspect of the present invention, there is provided a shift lever assembly including a base member and a shift lever. The shift lever is pivotally mounted to the base member and can be moved by an operator along a shift lever path from an initial position to at least one further position relative to the base member. The pivotal mounting of the shift lever to the base member is configured to enable the shift lever to be mounted in a plurality of pivotal mounting configurations relative to the base member. Each pivotal mounting configuration defines a unique shift lever path relative to the base member.

The pivotal mounting of the shift lever to the base member may be configured to provide two mounting configurations, with a first mounting configuration adapted for use of the shift lever assembly in a right-hand drive vehicle, and the second mounting configuration adapted for use in a left-hand drive vehicle.

In one form the shift lever assembly may include first and second shift lever shifting paths. The first shifting path is provided for the automatic shift mode, allowing for the pre-selection of any one of, for example; a park (P) position, a reverse (R) position, a neutral (N) position, and at least one drive range (D) position. The second shifting path is provided for the manual shift mode, and includes three positions in which the shift lever can adopt a neutral (or centre) position, an up-shift position and a down-shift position.

In a preferred form, the assembly includes a switching means mounted to the base member for generating an operating signal in response to pivotal movement of the shift lever relative to the base member. The switching means is configured to enable mounting in a plurality of positions on the base member to facilitate the generation of an operating signal in each of the shift lever paths, thereby providing the potential for use in a left or right hand-drive vehicle.

The switching means may be configured to enable mounting in at least two positions on the base member of an assembly having both automatic and manual shift lever paths.

Preferably, the switching means is provided in a module (or unit) which is mounted to the base member in a desired position.

The switching means could adopt any practical form. In a preferred form, the switching means includes an electromechanical switch, such as an electro-mechanical microswitch. However, it is to be appreciated that the switching means could also Include any one or combination of magnetic, sonic, air and light switches.

Preferably, an actuator is provided for actuating the switch The switch and switch actuator could be mounted to the mounting plate. A means for biasing the switch actuator from a switch actuating position to a non-actuating position may be provided. The biasing means may be mounted on the mounting plate.

The biasing means may include at least one (and more preferably two) torsion or leaf spring, with one end of the spring mounted to the mounting plate, and the other end including a contact surface for contact with the switch actuator.

The biasing means provides the advantage of a simplified design for assisting in limiting the displacement of the switch actuator and switch. The biasing means also provides the advantage of a simplified design for assisting in returning the switch actuator and switch to the neutral position upon the operator having selected the desired transmission manual operating mode.

The switching means may also include a means for providing a positive shift lever feel for the operator when moving the shift lever from the initial position to the at least one further position. Preferably, a positive shift lever feel is provided when both up-shifting and down-shifting the shift lever when in the manual mode.

In a preferred form, the means for providing a positive shift lever feel includes at least one (and more preferably two) torsion or leaf spring, with one end of the spring mounted to the mounting plate, and the other end including a contact surface for contact with the biasing means.

The assembly preferably also includes a base cover plate for mounting to the base member. The base cover plate includes a slot for receiving the shift lever there through. The slot is configured to enable an operator to move the shift lever relative to the base member between the initial position and the at least one further position. The base cover plate is configured to enable mounting in a plurality of configurations and/or orientations relative to the base member to accommodate each of the unique shift lever paths.

In one form the base cover plate could be configured to enable mounting to the base member in, at least, one of two possible positions, depending upon whether the shift lever assembly is configured for use in a left or right-hand drive vehicle. In this respect, the base cover plate could be mounted to the base member such that the slot in the cover plate aligns with each unique shift lever path, irrespective of the specific pivotal mounting configuration of the shift lever relative to the base member.

It will be convenient to hereinafter describe a preferred embodiment of the invention with reference to the accompanying drawings. The particularity of the drawings is to be understood as not limiting the preceding broad description of the invention.

In the drawings:

FIG. 7 is a top view of the shift lever assembly of FIGS. 1 and 2, but with some components excluded for clarity.

FIG. 8 is a perspective view of the shift lever assembly as illustrated in FIG. 7.

FIG. 13 is a top view of the shift lever assembly of FIG. 1 when provided in an alternative configuration.

FIG. 14 is a perspective view of a portion of the shift lever assembly as illustrated in FIG. 13.

FIG. 15 is an end view of the shift lever assembly as illustrated in FIG. 14.

Figure 4:
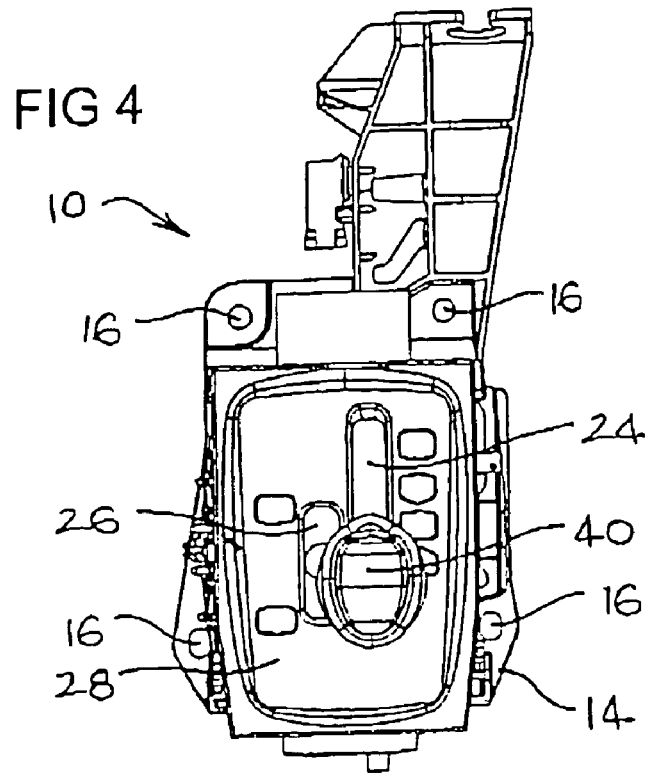
FIG. 4 is a top view of the shift lever assembly as illustrated in FIG. 3.
Figure 5:
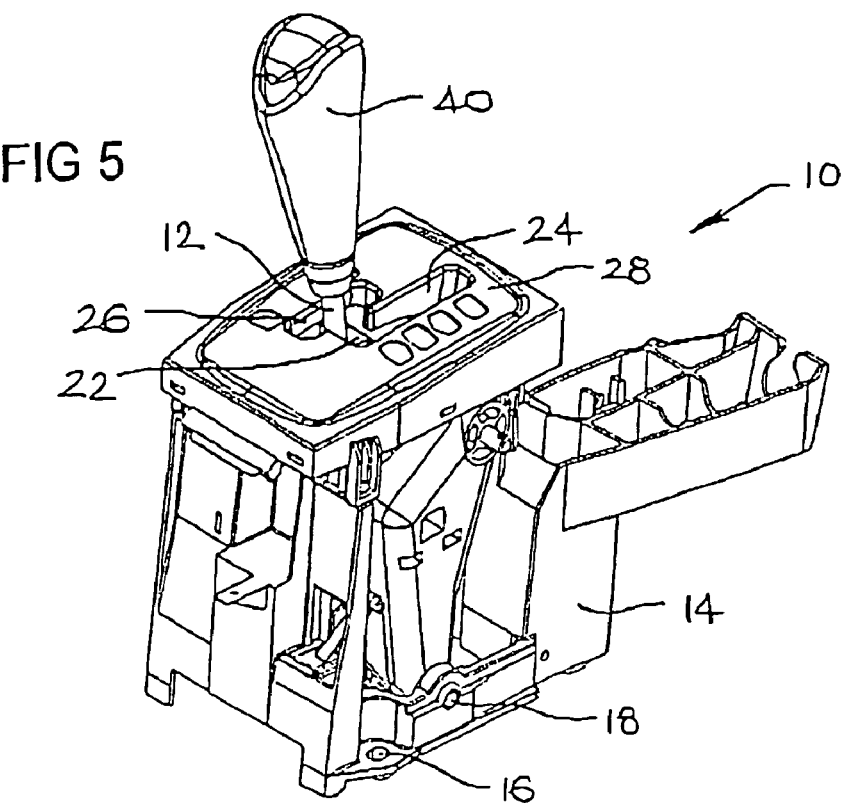
FIG. 5 is a perspective view of the shift lever assembly of FIG. 1 with the shift lever in another operating mode.
Figure 6:
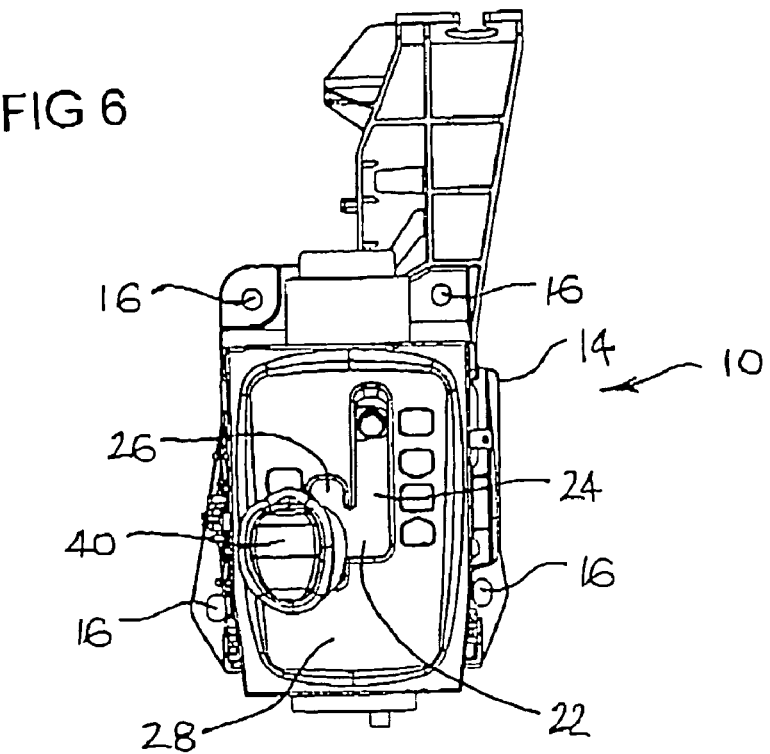
FIG. 6 is a top view of the shift lever assembly as illustrated in FIG. 5.
Figure 10:
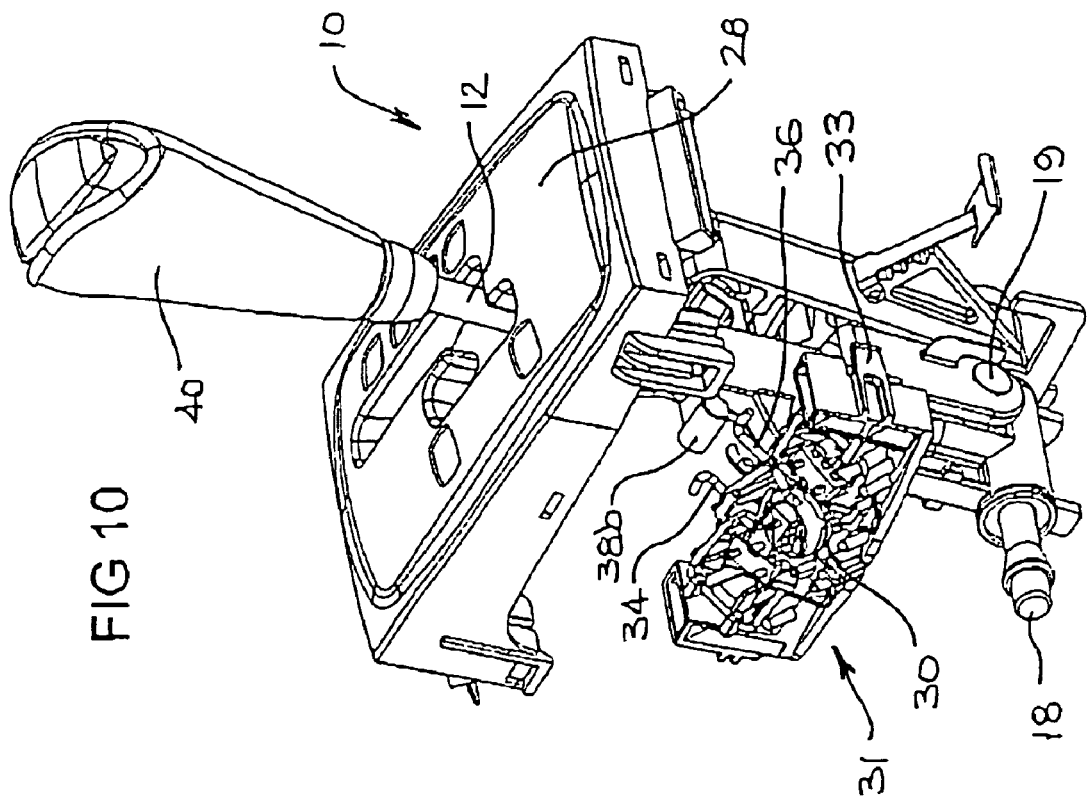
FIG. 10 is a perspective view of the shift lever assembly as illustrated in FIG. 9.
Figure 9:
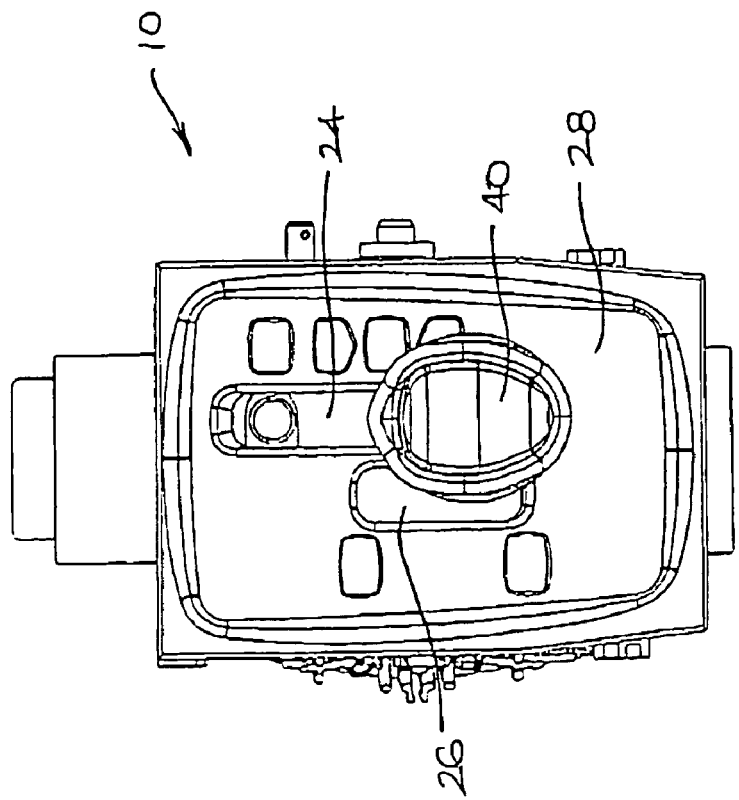
FIG. 9 is a top view of the shift lever assembly as illustrated in FIGS. 3 and 4, but with some components excluded for clarity.
Figure 12:
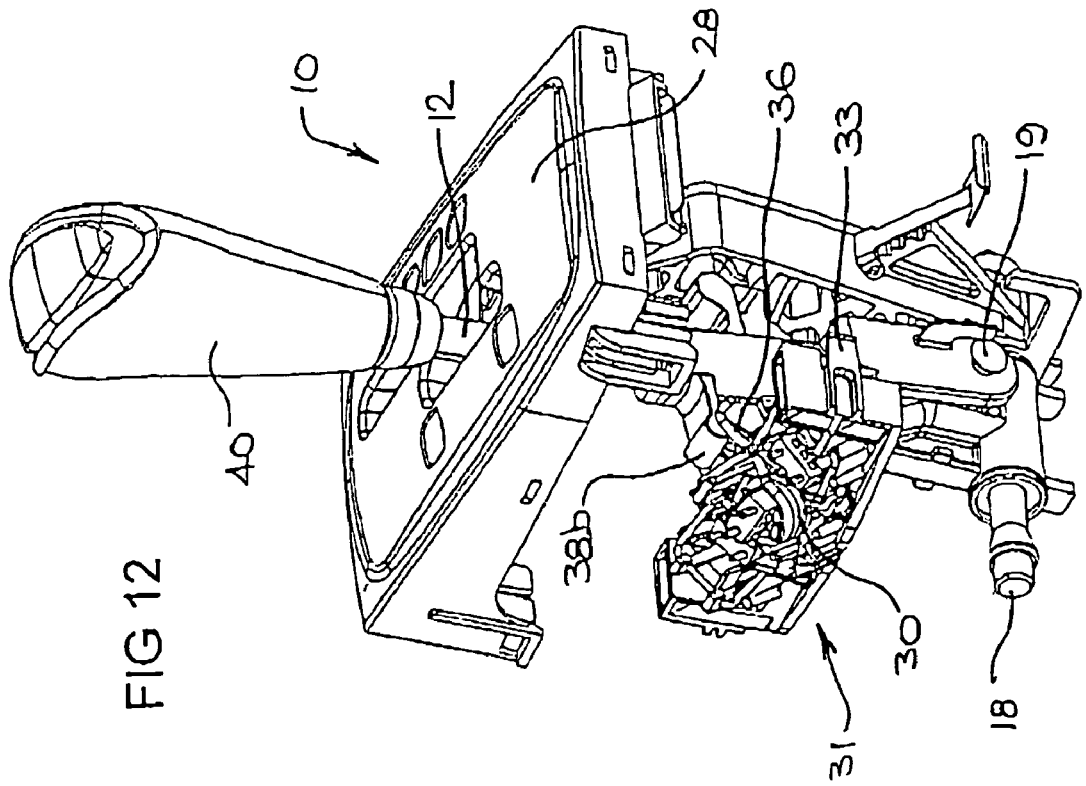
FIG. 12 is a perspective view of the shift lever assembly as illustrated in FIG. 11.
Figure 11:
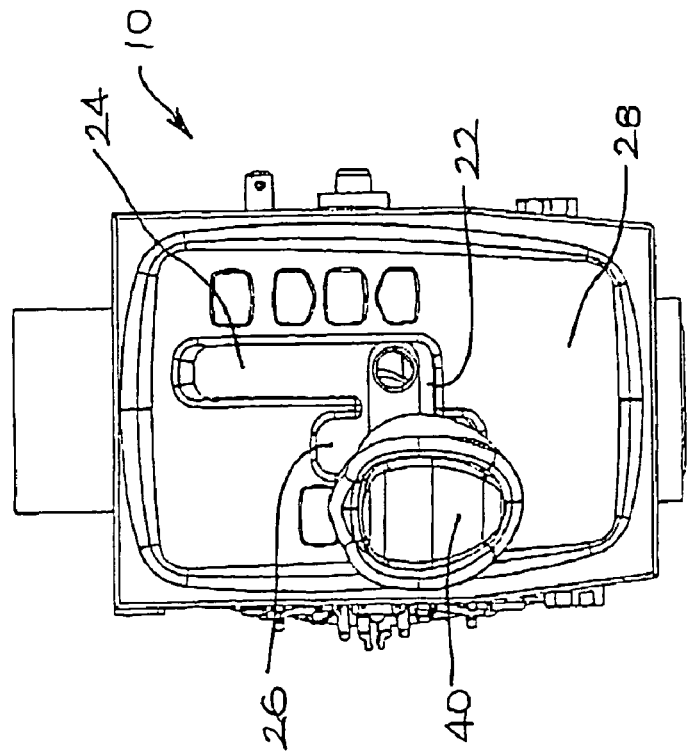
FIG. 11 is a top view of the shift lever assembly as illustrated in FIGS. 5 and 6, but with some components excluded for clarity.
Figures 16, 17, 18:
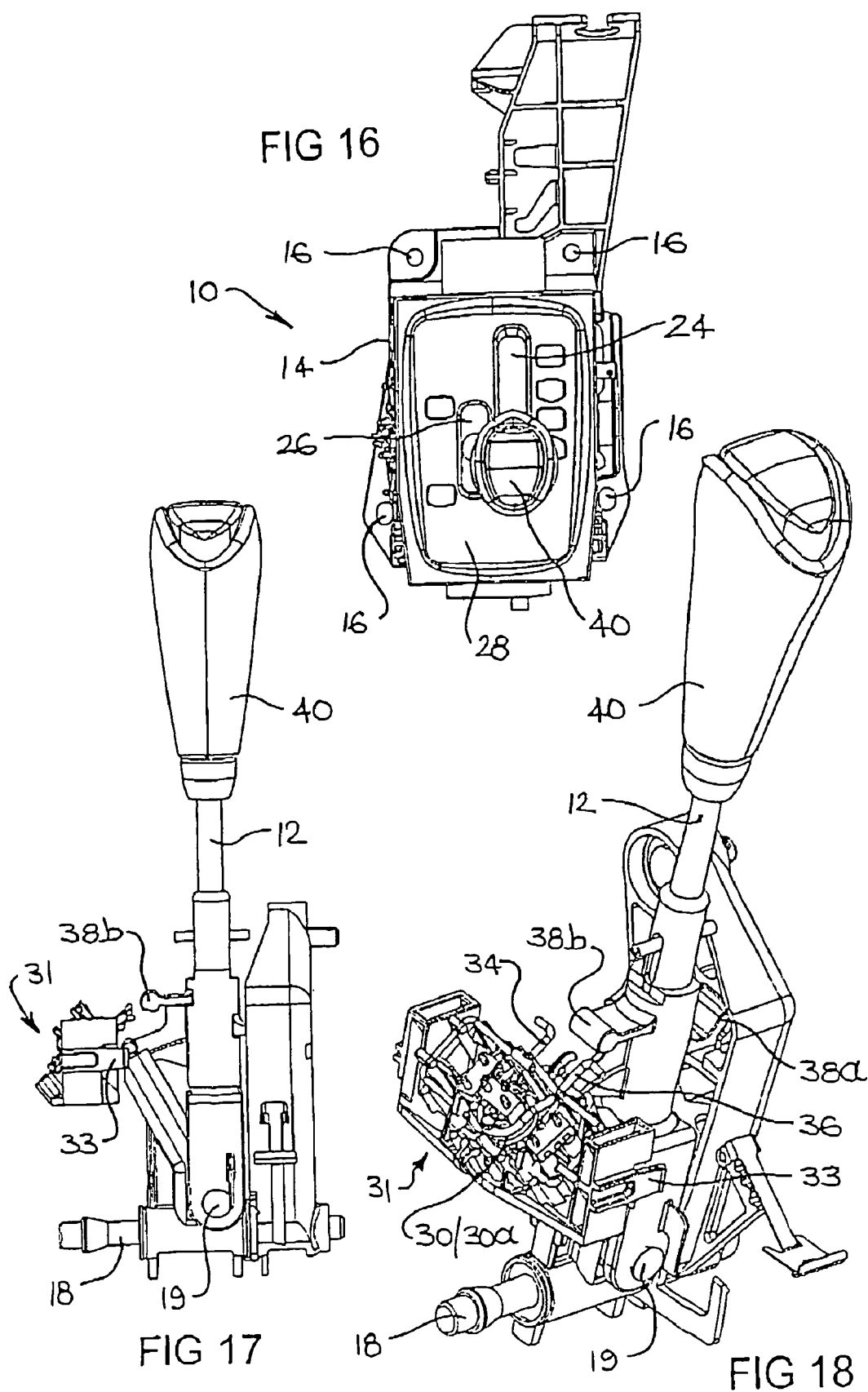

FIG. 16 corresponds to FIG. 4.

FIG. 17 is an end view of a portion of the shift lever assembly as illustrated in FIG. 16.

FIG. 18 is a perspective view of the shift lever assembly as illustrated in FIG. 17.

Figure 1:
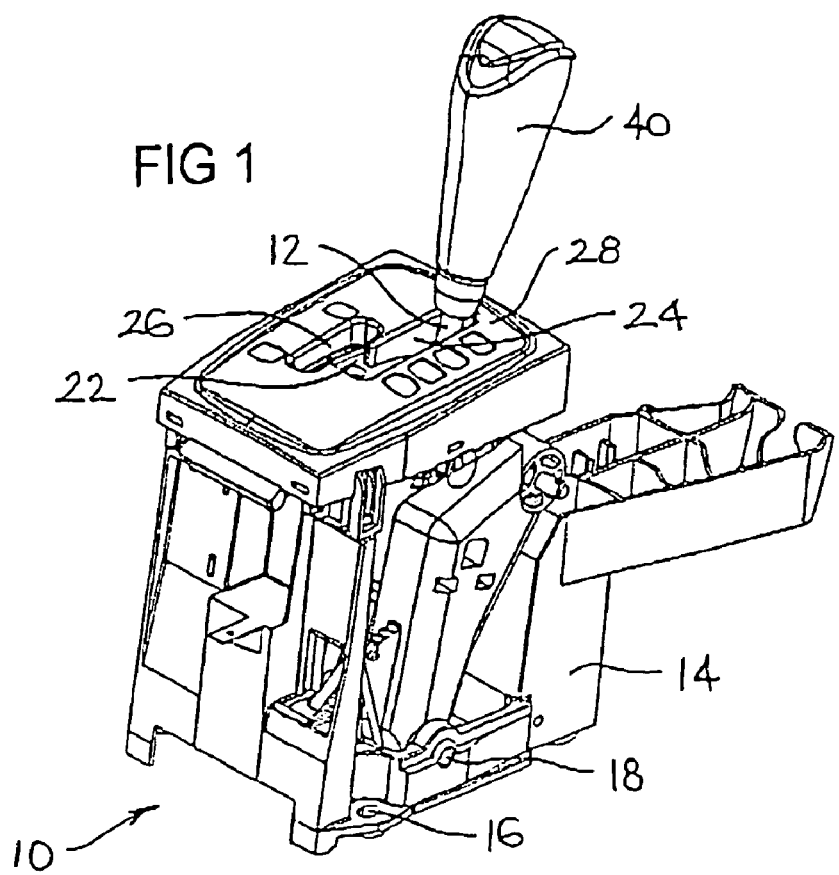
FIG. 1 is a perspective view of a shift lever assembly according to one aspect of the present invention.
Figure 2:
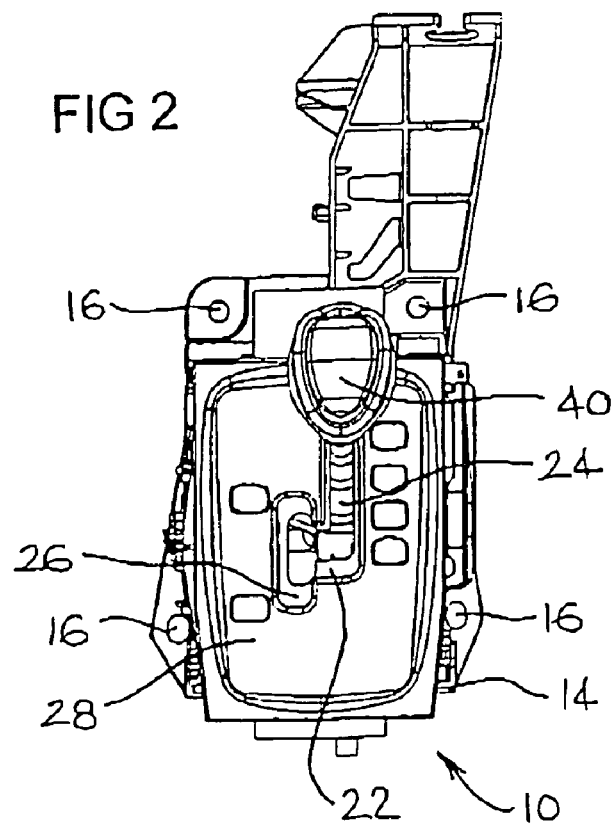
FIG. 2 is a top view of the shift lever assembly of FIG. 1.
Figure 3:
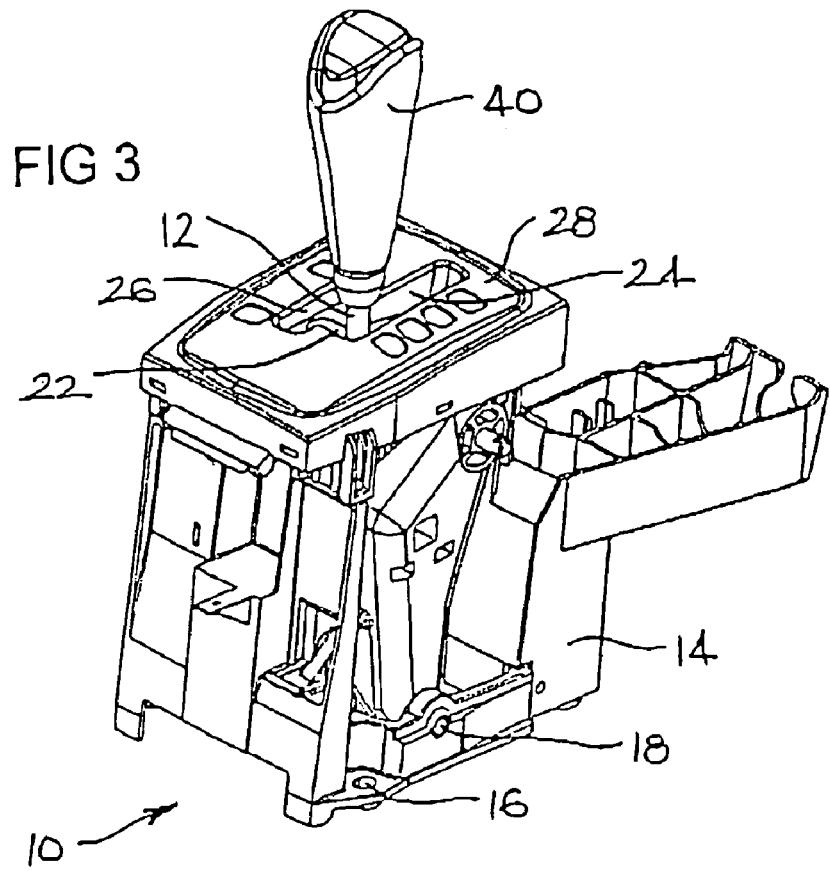
FIG. 3 is a perspective view of the shift lever assembly of FIG. 1 with the shift lever in another operating position.
Figure 19:
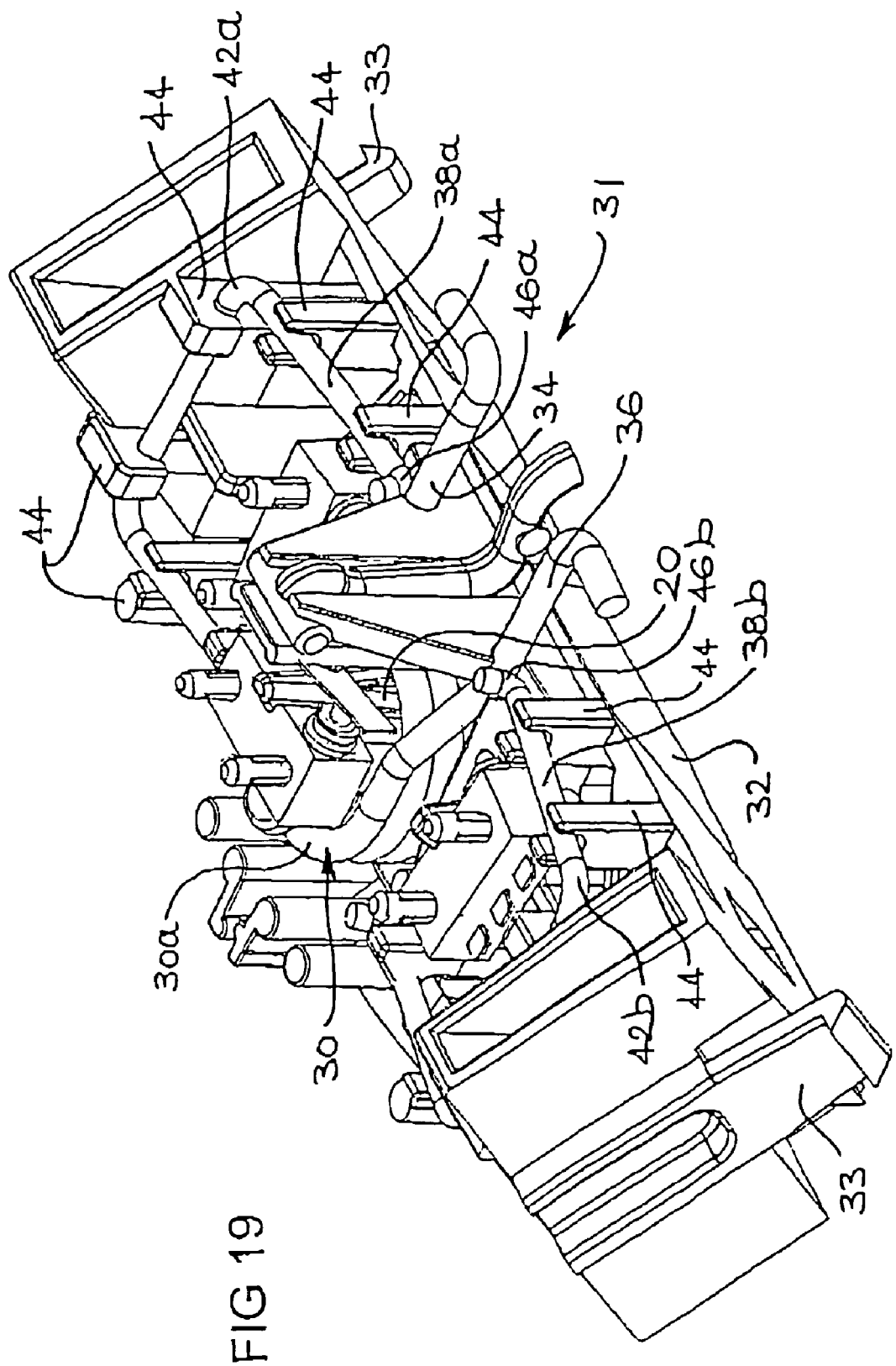

FIG. 19 is a perspective view of the switching means of FIG. 1 according to one aspect of the present invention.

Figure 20:
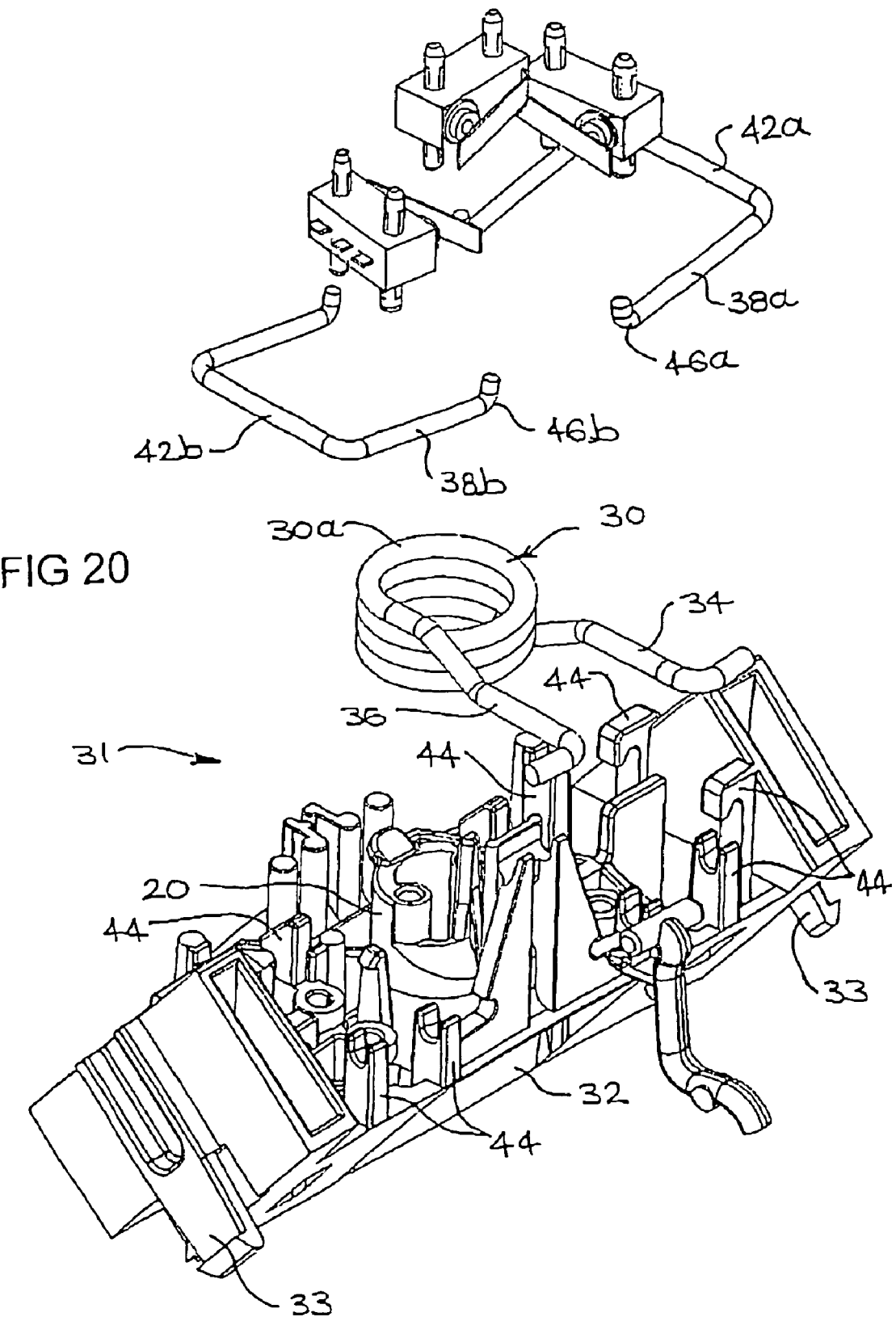

FIG. 20 is an exploded perspective view of the switching means illustrated in FIG. 19.

Referring to the FIGS. 1 to 12 and 16 to 18, there is illustrated a shift lever assembly 10 configured for use in a right-hand drive vehicle. The shift lever assembly 10 includes a shift lever 12 and a base member 14. The base member 14 is secured to a vehicle floor (not illustrated) by fasteners (not illustrated) inserted through mounting holes 16.

The shift lever 12 includes (and is pivotally movable relative to the base member 14 by way of) a first pivot shaft 18 and a second pivot shaft 19.

The first pivot shaft 18 extends in the transverse direction of the vehicle and permits movement of the shift lever 12 in the longitudinal direction of the vehicle along either a shifting channel 24 for the automatic shift mode, or a shifting channel 26 for the manual transmission mode.

The second pivot shaft 19 extends in the longitudinal direction of the vehicle. This enables the shift lever 12 to pivot in the transverse direction of the vehicle in the transverse channel 22, from the shifting channel 24, to the shifting channel 26.

The channels 22, 24, 26 are as defined in the cover plate 28. The cover plate 28 is mountable to the base member 14 in either of the arrangements illustrated in, for example, FIG. 13 (for a left-hand drive vehicle) and FIGS. 1 to 12 and 16 (for a right-hand drive vehicle). Any suitable means could be used to mount the cover plate 28 to the base member 14. The shift lever 12 extends upwardly through the aperture created in the cover plate 28 by the channels 22, 24, 26.

The shift lever 12 is located in the shifting channel 24 when it is desired to pre-select the driving positions. In this channel, and by means of pivoting movement of the shift lever 12 about the first pivot shaft 18, each of the driving positions: the park (P) position, the reverse (R) position, the neutral (N) position, and the drive (D) position are transmitted to the automatic transmission (not illustrated) and are engaged successively.

When the shift lever 12 is in the shifting channel 26 (the manual mode), shifting of the shift lever in the driving direction D of the vehicle causes an up-shift by one gear in the automatic transmission. Subsequently, the shift lever 12 is set back into the neutral position of the shifting channel 26 by a torsion spring 30 provided in a switching means 31.

If the shift lever 12 is again moved in the driving direction of the vehicle, a further up-shift by one gear in the automatic transmission will occur (unless the highest gear is already engaged), whereupon the action of the torsion spring 30 returns the shift lever 12 to the neutral position.

Shifting of the shift lever 12 in a direction opposite to the vehicle driving position (and when in the shifting channel 26) causes a down-shift by one gear of the automatic transmission, whereupon the action of the torsion spring 30 again returns the shift lever 12 to the neutral position.

The torsion spring 30 is fitted about a lug 20. The lug 20 is integrally connected to a mounting plate 32 of the switching means 31, as illustrated in detail in FIGS. 19 and 20. The coils 30a of the torsion spring 30 provide an interference fit with the lug 20, such that the torsion spring 30 is self-retaining on the lug 20.

The torsion spring 30 includes a pair of arms 34,36 for actuating the switches 37a,b. Switch 37a generates an operating signal in response to the operator up-shifting the shift lever 12 when in the manual transmission mode. Switch 37b generates an operating signal in response to the operator down-shifting the shift lever 12 when in the manual transmission mode. Displacement of the arms 34,36 by the shift lever 12 occurs via either one of lugs 38a, 38b provided on the shaft of shift lever 12, this being dependant upon whether the assembly 10 is configured for use in a left or right-hand drive vehicle.

The shift lever 12 and base member 14 can be configured for use in a left-hand drive vehicle when in the manual mode, as illustrated particularly in FIGS. 13 to 15. In this arrangement, lug 38a actuates the arms 34,36 and lug 38b provides no actuating function.

Alternatively, the shift lever 12 and base member 14 can be configured for use in a right-hand drive vehicle, as clearly illustrated in FIGS. 1 to 12 and 16 to 18. The shift lever 12, when configured for use in a right-hand drive vehicle, is rotated axially relative to the base member 14 through an angle of approximately 180° when compared to its mounting arrangement for use in a left-hand drive vehicle (as illustrated in FIGS. 13 to 15). In the right-hand drive vehicle mode, lug 38b actuates the arms 34,36 and lug 38a provides no actuating function.

It is to be appreciated that the shift lever 12 is rotated axially relative to the base member 14 through approximately 180° when configuring the assembly 10 between use for a left and right-hand vehicle. However, the hand-grip portion 40 of the shift lever 12 remains stationary and is not rotated relative to the base member 14.

Also, it is to be appreciated from the drawings that the switching means 31 is mounted to the base member 14 (via clip mounts 33) in either of two possible orientations, dependent on whether the assembly 10 is configured for a left or right-hand drive vehicle. The orientation for use in a left-hand drive vehicle is illustrated in FIGS. 13 to 15, and the orientation for use in a right-hand drive vehicle is illustrated in FIGS. 1 to 12 and 16 to 18.

Referring again to FIGS. 19 and 20, the switching means 31 includes biasing means in the form of torsion springs 42a,b. The springs 42a,b are mounted to supports 44. The supports 44 are integrally attached to the mounting plate 32. The springs 42a,b include contact surfaces 46a,b.

Actuation and displacement of the arm 34 a pre-defined distance (in response to an operator up-shifting the lever 12 when in the manual shifting mode) results in the arm 34 contacting the contact surface 46a. This, in turn, causes the spring leg 38a to twist relative to the mounting plate 32, thereby generating a torsional force in the spring 42a and biasing the arm 34 towards its at-rest position. The biasing force generated in the spring 42a is in addition to the biasing force generated in the torsion spring 30 (as a result of the displacement of the arm 34).

A similar operating arrangement exists between the arm 36 and the spring 42b, upon an operator down-shifting the lever 12 when in the manual mode.

A benefit of including springs the 42a,b is that it provides a positive shifter feel for the operator when up-shifting and down-shifting the lever 12 when in the manual mode.

The above described shift lever assembly 10 provides a simplified construction, including a reduction in the number of components, when compared to existing assemblies. The present invention also provides a shift lever assembly 10 of lower production cost when compared to existing assemblies.

Desirably, the present invention also virtually obviates the need to manufacture separate component sets for left and right-hand drive versions of the assembly 10, greatly reducing current set-up costs.

Finally, it is to be understood that various alterations, modifications and/or additions may be introduced Into the construction and arrangement of the parts previously described without departing from the spirit or ambit of this invention.

Having now described our invention, what we claim as new and desire to secure by Letters Patent is:

1. A shift lever assembly comprising a base member and a shift lever; the shift lever being pivotally mounted to the base member; and the shift lever being pivotally adjustable by an operator, relative to the base member, along a shift lever path from an initial position to at least one further position; wherein the pivotal mounting of the shift lever to the base member enables the shift lever to be mounted in a plurality of pivotal mounting configurations relative to the base member; with each pivotal mounting configuration defining a unique shift lever path relative to the base member, the plurality of pivotal mounting configurations comprising a first mounting configuration adapted for use of the shift lever assembly in a right-hand drive vehicle, and a second mounting configuration adapted for use in a left-hand drive vehicle, wherein the first and second mounting configurations each comprise a first shift lever shifting path and a second shift lever shifting path; with each first shifting path being provided for an automatic shift mode and each second shifting path being provided for a manual shift mode.

2. A shift lever assembly comprising a base member and a shift lever; the shift lever being pivotally mounted to the base member; and the shift lever being pivotally adjustable by an operator, relative to the base member, along a shift lever path from an initial position to at least one further position; wherein the pivotal mounting of the shift lever to the base member enables the shift lever to be mounted in a plurality of pivotal mounting configurations relative to the base member; with each pivotal mounting configuration defining a unique shift lever path relative to the base member, wherein at least one mounting configuration comprises a first shift lever shifting path and a second shift lever shifting path.

3. A shift lever assembly according to claim 2, wherein the plurality of pivotal mounting configurations comprise a first mounting configuration adapted for use of the shift lever assembly in a right-hand drive vehicle, and a second mounting configuration adapted for use in a left-hand drive vehicle.

4. A shift lever assembly according to claim 3, wherein the first shifting path being provided for an automatic shift mode and the second shifting path being provided for a manual shift mode.

5. A shift lever assembly according to claim 4, comprising a switching means mounted to the base member for generating an operating signal in response to pivotal movement of the shift lever relative to the base member; wherein the switching means is configured to enable mounting in a plurality of positions on the base member to facilitate the generation of an operating signal in each of the mounting configurations.

6. A shift lever assembly according to claim 5, wherein the switching means is configured to enable mounting in two positions on the base member of an assembly having both automatic and manual shift lever paths.

7. A shift lever assembly according to claim 5, wherein the switching means comprises at least one of an electromechanical micro-switch, a magnetic switch, a sonic switch, an air switch and a light switch.

8. A shift lever assembly according to claim 5, wherein the switching means comprises a module for mounting to the base member.

9. A shift lever assembly according to claim 5, wherein the switching means comprises a means for biasing a switch actuator from a switch actuating position to a non-actuating position.

10. A shift lever assembly according to claim 9, wherein the biasing means is mounted on the mounting plate.

11. A shift lever assembly according to claim 9, wherein the biasing means is selected from the consisting of at least one torsion spring and at least one spring, with one end of the spring mounted to the mounting plate, and the other end including a contact surface for contact with the switch actuator and a contact surface for actuation by the shift lever.

12. A shift lever assembly according to claim 11, wherein the biasing means is selected from the group consisting of two torsion springs and two leaf springs.

13. A shift lever assembly according to claim 5, wherein the switching means comprises a means for providing a positive shift lever feel for an operator when moving the shift lever from the initial position to the at least one further position.

14. A shift lever assembly according to claim 13, wherein the means for providing a positive shift lever feel is selected from the group consisting of at least one torsion spring and at least one leaf spring, with one end of the spring mounted to the mounting plate, and the other end comprising a contact surface for contact with the biasing means.

15. A shift lever assembly according to claim 14, wherein the means for providing a positive shift lever feel is selected from the group consisting of two torsion springs and two leaf springs.

16. A shift lever assembly according to claim 2, comprising a base cover plate for mounting to the base member; the base cover plate comprising a slot for receiving the shift lever there through; the slot being configured to enable an operator to move the shift lever relative to the base member between the initial position and the at least one further position; and wherein the base cover plate is selected from the group, consisting of a base plate configured to enable mounting in a plurality of configurations, a base plate configured to enable mounting in a plurality of orientations and a base plate configured to enable mounting in a plurality of configurations and orientations, relative to the base member to accommodate each of the unique shift lever paths.

17. A shift lever assembly according to claim 16, wherein the base cover plate is configured to enable mounting to the base member in two possible orientations, including a first orientation for use in a left-hand drive vehicle and a second orientation for use in a right-hand drive vehicle.

* * * * *